US006459084B1

United States Patent
Boreman et al.

(10) Patent No.: US 6,459,084 B1
(45) Date of Patent: Oct. 1, 2002

(54) AREA RECEIVER WITH ANTENNA-COUPLED INFRARED SENSORS

(75) Inventors: Glenn Boreman, Geneva, FL (US); Francisco Javier Gonzalez, Orlando, FL (US); Michael A. Gritz, Altamonte Springs, FL (US); Julian Codreanu, Newark, DE (US); Christophe Fumeaux, Faellanden (CH)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/481,804

(22) Filed: Jan. 12, 2000

Related U.S. Application Data

(63) Continuation-in-part of application No. 09/004,132, filed on Jan. 7, 1998, now Pat. No. 6,037,590.
(60) Provisional application No. 60/048,334, filed on May 30, 1997.

(51) Int. Cl.⁷ .............................. G01J 5/20; H01L 27/14
(52) U.S. Cl. ..................................... 250/349; 250/338.4
(58) Field of Search .......................... 250/338.4, 338.1, 250/349, 370.14, 332, 336.1

(56) References Cited

U.S. PATENT DOCUMENTS

| | | | |
|---|---|---|---|
| 5,021,663 A | | 6/1991 | Hornbeck .................... 250/349 |
| 5,171,733 A | * | 12/1992 | Hu .............................. 505/161 |
| 5,248,884 A | * | 9/1993 | Brewitt-Taylor et al. 250/338.4 |
| 5,286,976 A | | 2/1994 | Cole .......................... 250/349 |
| 5,300,915 A | | 4/1994 | Higashi et al. ........... 338/22 R |
| 5,331,162 A | * | 7/1994 | Silver et al. ............. 250/336.2 |
| 5,367,167 A | | 11/1994 | Keenan .................... 250/338.4 |
| 5,450,053 A | * | 9/1995 | Wood .......................... 338/18 |
| 5,591,959 A | | 1/1997 | Cigna et al. ............. 250/208.1 |
| 5,640,013 A | | 6/1997 | Ishikawa et al. ......... 250/338.4 |
| 5,647,946 A | | 7/1997 | Belcher et al. ............. 156/345 |
| 5,760,398 A | | 6/1998 | Blackwell et al. .......... 250/332 |
| 5,777,328 A | | 7/1998 | Gooch ...................... 250/338.4 |
| 5,777,336 A | | 7/1998 | Silver et al. ........... 250/370.15 |
| 6,037,590 A | * | 3/2000 | Boreman et al. ........ 250/338.4 |
| 6,100,525 A | * | 9/2000 | Eden ........................ 250/338.1 |
| 6,201,242 B1 | * | 3/2001 | Eden et al. ................. 250/332 |
| 6,218,667 B1 | * | 4/2001 | Nonaka et al. ............. 250/353 |
| 6,242,740 B1 | * | 6/2001 | Luukanen et al. .......... 250/353 |

FOREIGN PATENT DOCUMENTS

| | | | | |
|---|---|---|---|---|
| GB | 2 306 769 A | * | 5/1997 | ....... H01L/31/0232 |
| JP | 9-162424 A | * | 6/1997 | ........... H01L/31/02 |

* cited by examiner

*Primary Examiner*—Constantine Hannaher
*Assistant Examiner*—Albert Gagliardi
(74) *Attorney, Agent, or Firm*—Brian S. Steinberger; Law Offices of Brian S. Steinberger, P.A.

(57) ABSTRACT

A small array of antenna-coupled infrared bolometer detectors is connected in parallel. This small array is suitable as an individual area-receiving pixel of an infrared focal plane array. These pixels will have better coupling efficiency to extended sources than are possible with individual antenna-coupled sensors, which have a spatial response on the order of one wavelength in dimension. This pixel can be used to provide the advantages of antenna-coupled IR sensors (e.g., fast response, wavelength tuning, and polarization tuning) while increasing the collection efficiency of the sensors to non-laser sources. When integrated into focal plane arrays, these detectors can be used in remote-sensing systems to facilitate enhanced image recognition, feature extraction and image-clutter removal. A preferred version of the pixel forming the focal plane array antenna has a plurality of two parallel longitudinal metal antenna arms extending outward and opposite from an infrared (IR) bolometer sensor to separate parallel contact pads connected in turn to a means for receiving the output from said antenna. Application areas can include earth-resource mapping, pollution monitoring, and general surveillance.

14 Claims, 5 Drawing Sheets

AREA RECEIVER WITH ANTENNA-COUPLED INFRARED SENSORS

This application is a continuation in part of Ser. No. 09/004,132, filed Jan. 7, 1998, which claims priority ot provisional application Seial No. 60/048,334, filed May 30, 1997, now U.S. Pat. No. 6,037,590.

This invention relates to an area infrared receiver, and in particular to an area receiver with antenna-coupled infrared sensors, which include two sets of parallel antenna arms disposed across contact pads and separated from the adjacent arms by bolometers and allows development of area reception from antenna-coupled infrared sensors which are the component pixels for focal-plane arrays of antenna-coupled infrared sensors and this work was supported by Space & Air Warfare Systems Command Contract No. N66001-98-D-6003, and this invention is a Continuation-In-Part of U.S. application Ser. No. 09/004,132 filed on Jan. 7, 1998, now issued as U.S. Pat. No. 6,037,590, which claims the benefit of priority to U.S. Provisional Application No. 60/048,334 filed May 30, 1997, all by the same assignee as the subject invention and which are incorporated by reference.

BACKGROUND AND PRIOR ART

Infrared (IR) systems have been widely used in the past. Current systems generally require bulk optical systems having multiple moving parts for polarization control. Image forming radiation is typically collected for a fixed polarization state. Optical filters must be used in the optical train before the receiving detector array. The typical weight of the necessary filter and switching assemblies is on the order of 1 kg or more. Polarization-resolved imagery is largely unexploited because of inconvenient implementation, inadequate antenna collectivity and/or receptivity.

Many U.S. Patents have been proposed for infrared detectors but have many of the problems previously described including the preferenced inadequacy of the antenna systems. Arrays of infrared sensors are known: see for example U.S. Pat. No. : 5,021,663 to Hornbeck; U.S. Pat. No. 5,286,976 to Cole; U.S. Pat. No. 5,300,915 to Higashi, et al; U.S. Pat. No. 5,367,167 to Keenan; U.S. Pat. No. 5,591,959 to Cigna, et al; U.S. Pat. No. 5,647,956 to Belcher, et al; and, U.S. Pat. No. 5,436,453 to Chang et al but nowhere is there a mention of antenna-coupled sensors.

Blackwell, et al in U.S. Pat. No. 5,760,398 mentions an antenna (see col. 4, lines 18 and 67; col. 20, line 64 and col. 22, line 1) with respect to absorbtion of incident radiation but only in reference to the primary focus of their disclosure, i.e., the area receiver pixel radiation collector which is geometrical optical based. There is no mention of the dimension of the legs "1" that would be required in order to make the connections seen in FIG. 3 into an antenna. The patent talks about the dimensions compared to the wavelength of the reflector 11 and 12 (see col. 9, lines 40–50) but not the antenna arm length in wavelength units. The plural units of FIG. 9 are individual pixels with one sensor per pixel (see col. 6, lines 53–54 and col. 21, line 17) to achieve the desired geometric design and in no way related to cooperate with the legs to provide an area receiver.

Gooch in U.S. Pat. No. 5,777,328 discloses bolometer arrays with no antennas and each bolometer "a separately sensed pixel" (see col. 15, line 32).

Silver, et al in U.S. Pat. No. 5,777,336 discloses an array of microcalorimeters responsive to x-ray fluoresence, not infrared radiation.

SUMMARY OF THE INVENTION

The first objective of the present invention is to provide an area receiver for an infrared (IR) detector antenna system.

The second object of this invention is to provide an area IR detector antenna system of a plurality of pixels in the form of antenna-coupled IR sensors.

The third object of this invention is to provide an IR detector area antenna system where antenna-coupled IR sensors provide the individual pixels of focal-plane arrays of antenna-coupled IR sensors.

In the subject invention, an infrared (IR) detector antenna for detecting IR radiation has been realized by a pixel array, preferably a focal plane pixel array, of a plurality of infrared (IR) bolometer sensors for receiving IR radiation with a first and a second parallel antenna arm extending outwardly and separately from each of said sensors to parallel contact pads; and output means for receiving the output from said sensors whereby the IR detector antenna unit has enhanced spatial response, fast response and collection efficiency of the IR sensors. Each novel detector pixel can have exterior dimensions of between approximately 10 micrometers to approximately 50 micrometers on each side. The size of the array can be approximately 512 to approximately 2000 micrometers across each side.

These antenna-coupled pixels and their arrays can be used in remote-sensing systems to facilitate IR collection efficiency, enhanced image recognition, feature extraction, and image-clutter removal. The application areas can include earth-resource mapping, pollution monitoring and general surveillance.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
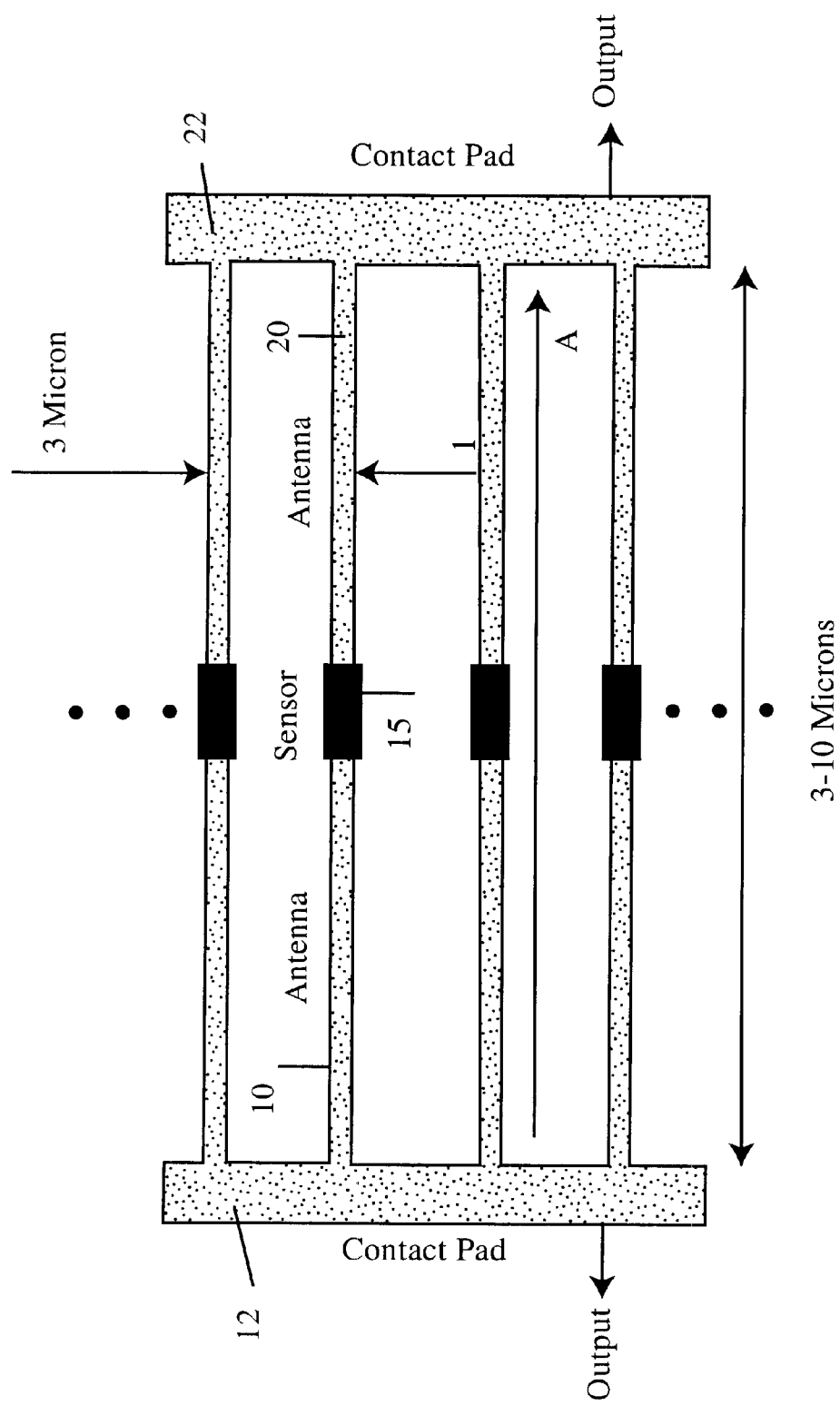
FIG. 1 is a drawing of a top view of a single antenna-coupled pixel sensor.
Figure 5:
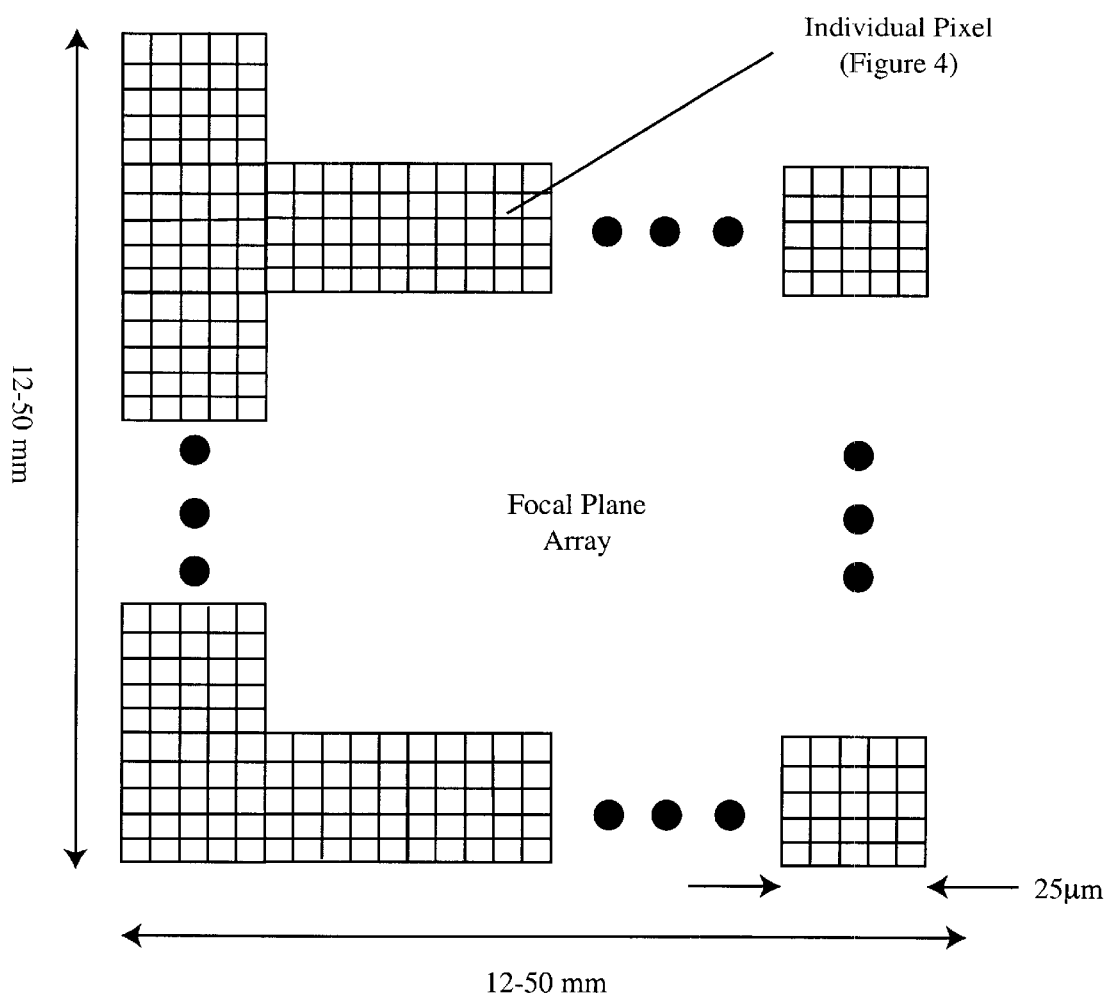
FIG. 5 is a focal plane array composed of a matrix of individual pixels, each consisting of a series-parallel connection of antenna-coupled sensors.

FIG. 1 is a top view of a single antenna-coupled sensor pixel. Pixels are arranged into focal-plane arrays as shown in FIG.5. The antenna arms 10, 20 of the pixel of FIG. 1 are made of metal (such as but not limited to aluminum, gold, nickel, etc.) and electrically connected between the bolometer sensor material 15 and the output contact pads 12 and 22, respectively. The arms 10, 20 have a length approximately equal to one half of the wavelength of the radiation incident on the pixel of FIG. 1 which is represented thereon as approximately 5 micrometers. The optimum length has been fond to be 1.5 micrometers experimentally for illumination at 10 micrometers. Illumination through the silicon substrate produces a dielectric wavelength of around 3 micrometers.

Figure 2:
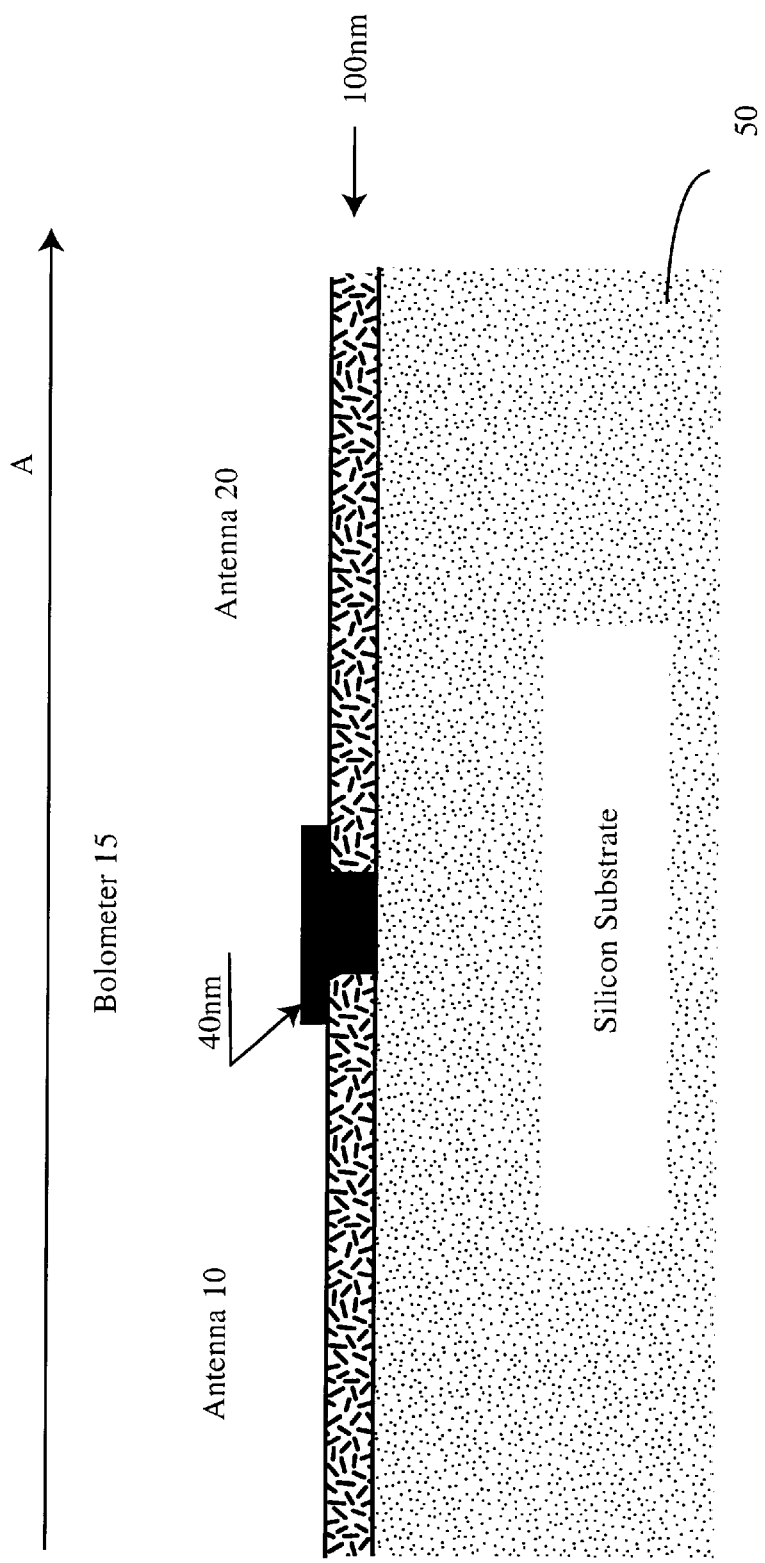
FIG. 2 is an enlarged side view of the contact region between the first and second parallel antenna arms of FIG. 1. along arrow A.

Referring to both FIGS. 1 and 2, antennas 10 and 20 are lithographically fabricated on top of a transparent substrate material 50 such as silicon. Antenna arms 10 and 20 are generally illuminated through the dielectric substrate 50, and then the relevant wavelength (as far as the length of the arms is concerned) is the wavelength of the radiation inside the substrate 50. This is the free-space wavelength of 10 micrometers (infrared) and for example, in a silicon substrate the substrate wavelength is around 3 micrometers.

Illumination from the air side is also possible (J. Alda, C. Fumeaux, M. Gritz, D. Spencer, G. Boreman, "Responsivity of infrared antenna-coupled microbolometers for air-side and substrate-side illumination," Infrared Physics and Technology, vol. 41, #1, Jan. 2000). This configuration can be easier to integrate with focal-plane array electronic readouts on the back side of the sensor.

Again referring to FIGS. 1 and 2, the incident electromagnetic radiation will induce infrared-frequency (on the order of 30 THz) current waves to flow in the antenna arms 10, 20 along the direction of the incident electric field (the electric field of incident radiation has an arbitrary in-plane orientation.). The induced current waves will propagate along the antenna arms 10 and 20 producing an infrared-frequency voltage across the sensor material 15 altering its resistance.

The sensor material 15 is preferably a vanadium oxide, since that material exhibits a particularly high temperature coefficient of resistance (TCR). Other materials, such as niobium, are also suitable, but have somewhat lower sensitivity. Important attributes include high TCR, high absorption of IR radiation, small thermal mass, and good thermal isolation. It has been found that deposition of the antenna arm metals first onto the semiconductor substrate gives better quality ohmic contacts between the bolometer and the antenna arm by avoiding oxidation at the bolometer-metal interface. The bolometer material is deposited by a sputtering process. The antenna arms and contact pads are deposited in the same step by an electron-beam evaporation process. For purposes of this disclosure "sensor" can be used interchangably with "bolometer".

The thickness of the bolometer (sensor) material is approximately 40 nanometers, and the thickness of the antenna arms and contact pads is approximately 100 nanometers. The cross-arm (in-plane) width of the antenna arms is approximately 200 nanometers. The along-arm width of the antenna is in the range from 2 micrometers to 10 micrometers. It has been experimentally found that 3 micrometers full width produces the best sensitivity. The bolometer is approximately 200 nanometers by 1 micrometer in dimension. The contact pads provide a low-frequency electrical connection to the sensor of the invention that allows monitoring of the resistance as a function of input flux.

FIG. 2 is an enlarged side view of the contact region between the first and second antenna and arms of FIG. 1. the (sensor) 15 and the output contact pads 12 and 22.

The infrared sensor material 15 constitutes a load impedance of nominally 100 ohms across the output contact pads 12 and 22 of the antenna arms 10 and 20, seen in the side view of FIG. 2. as indicated by arrow A.

For the sensors, the current waves are dissipated by the sensor materials causing a temperature rise in the sensor, and a change in its dc resistance. These changes in dc resistance provides the output from the output means of the pixel in its array whereby the amount of incident IR radiation can be measured by well known techniques such as discussed in U.S. Pat. No. 5,021,663 and by polarization tuning as disclosed in co-pending U.S. patent application Ser. No. 09/004,132 to Boreman et al., which issued as U.S. Pat. No. 6,037,590 of common assignee and incorporated herein by reference thereto.

Figure 3:
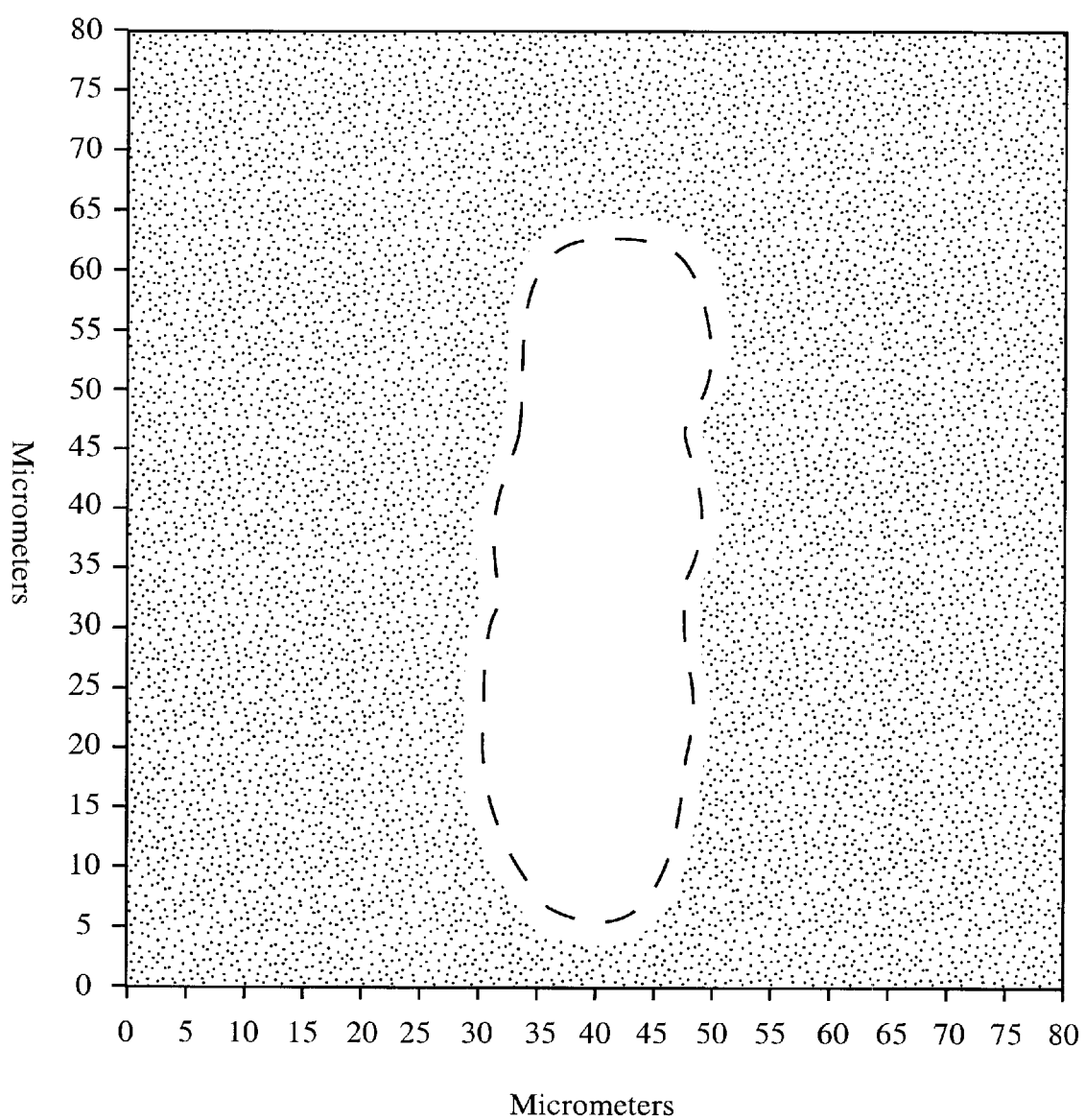
FIG. 3 is the measured spatial response having an area that is approximately 10 micrometers by 50 micrometers for a 15 element parallel array of sensors similar to FIG. 1.

FIG. 3 is the measured spatial response of the multiple element array structures similarly to that seen in FIG. 1. The spatially extended nature of the response of the structure is clearly seen. The spatial responses of the individual antennas will overlap, creating an aggregate sensor of extended area, a pixel. The dimensions of 10 micrometers by 50 micrometers are not optimum for integration into a square format focal plane array.

Figure 4:
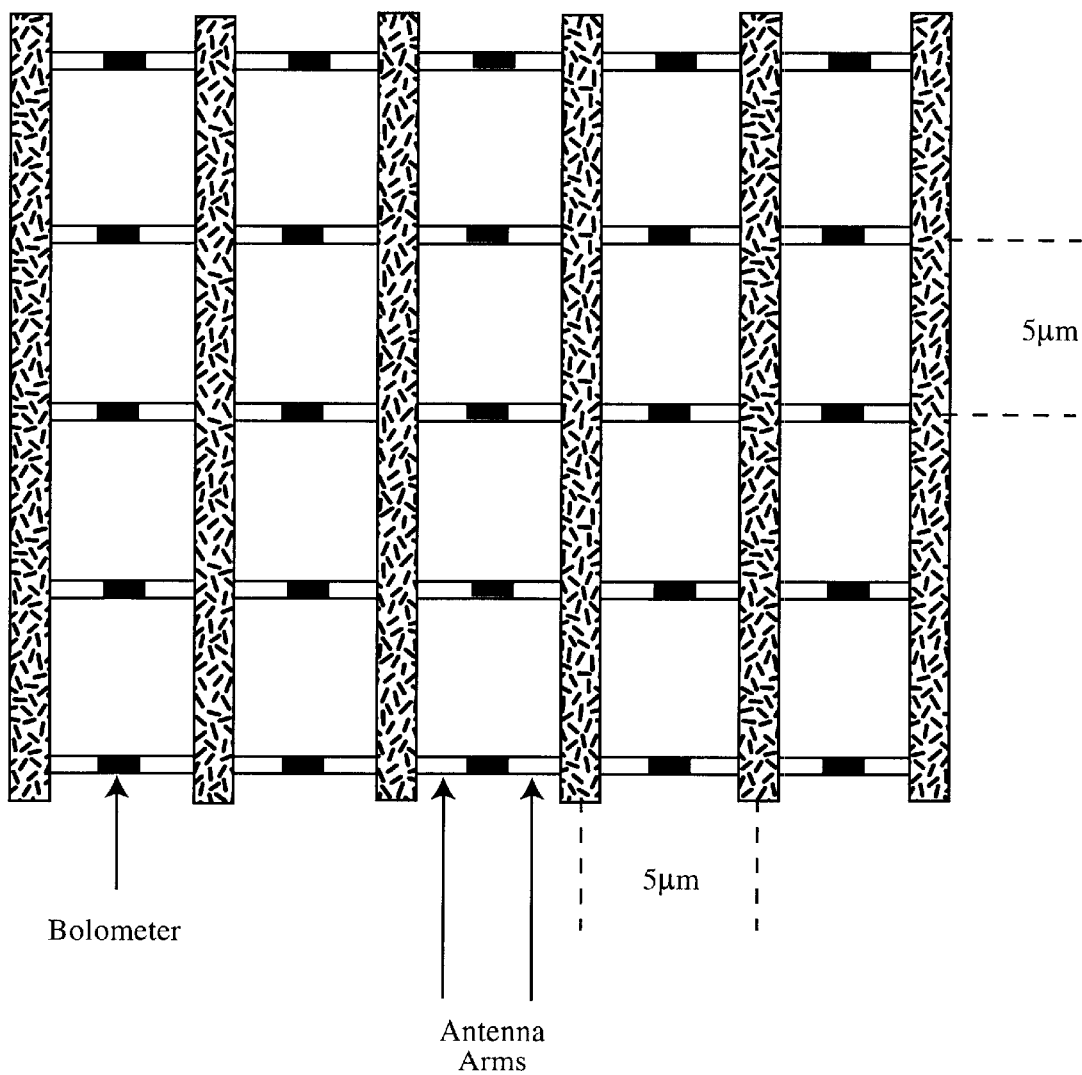
FIG. 4 is an improved series-parallel pixel design having a 25 micrometer by 25 micrometer square aspect ratio which is better for integration into focal-plane arrays.

FIG. 4 is an improved series-parallel pixel design of dimension 25 micrometers on a side, in a square aspect ratio format. These pixels will be the individual sensor elements of the focal plane array. Spatial information about the image is available only on the size scale of an individual pixel. For integration into a focal plane array format, it is desirable to have a square aspect ratio for the spatial response.

Thus the individual pixels of FIG.4 are arranged in a focal plane array as seen in FIG. 5. The plurality of pixel responses in a square array format as shown in FIG. 5 constitutes the image forming sensor array. FIG. 5 illustrates how the pixels of FIG. 4 provide useful focal-plane arrays ranging from 512 by 512 pixels to 2000 by 2000 pixels. The focal plane array can be placed in the image plane of an optical system. The arrangement and readout of individual pixels are capable of forming resolved images of the radiation that falls on the array. A focal plane array can contain a matrix of between approximately 512 pixels to approximately 2000 pixels on a side, yielding focal plane array dimensions of approximately 12 millimeters to approximately 50 millimeters on a side.

The invention facilitates the development of compact, no-moving parts, imaging polarimeters. Having an area antenna-coupled tuning mechanism integrated directly onto a chip will provide optical systems that are of increased collection efficiency.

Furthermore, the subject invention allows passive infrared sensors to have improved feature extraction, discrimination and clutter removal. It facilitates tuning which is substantially faster using electrically controlled antennae than using bulk optics. One-frame-at-a time tuning allows for faster algorithms to be implemented giving more complex capabilities in real-time, such as differentiation of man-made targets from foliage.

The focal-plane array of antenna-coupled detectors of the invention is highly useful in the reception of radiation from the field of view of a target scene such as an earth surface, weaponry and the like and can be readily adapted to remote sensing such as earth resource mapping, pollution monitoring, surveillance and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An Infrared (IR) detector antenna pixel for detecting IR radiation comprising:
   a plurality of infrared (IR) bolometer sensors for receiving IR radiation;
   a first and a second parallel metallic antenna arm extending outwardly and separately from each of said sensors to parallel contact pads; and
   output means for receiving the output from said sensors wherein the IR detector antenna pixel has enhanced spatial response, fast response and collection efficiency for the IR sensors.

2. The IR detector antenna pixel of claim 1, wherein each parallel arm is separated from the adjacent arm by 3 micrometers.

3. The IR detector antenna pixel of claim 1, wherein each pair of the parallel antenna arms is approximately 10 micrometers in length.

4. The IR detector antenna pixel of claim 1, wherein the infrared (IR) bolometer sensor is a vanadium oxide.

5. The IR detector antenna pixel of claim 4 wherein the vanadium oxide is V2O3.

6. The IR detector antenna unit of claim 1, wherein each of the antenna arms is formed from at least one metal chosen from:
   nickel, aluminum, and gold.

7. The IR detector antenna unit of claim 1, wherein the antenna arms are formed by:
   electron-beam lithography.

8. An Infrared(IR) detector antenna unit for detecting IR radiation comprising:
   an antenna-coupled focal plane array of pixels;
   each pixel having an infrared (IR) bolometer sensor for receiving IR radiation, two parallel longitudinal metal antenna arms extending outward and opposite from the sensor to parallel contact pads and output means connected between the antenna arms; and
   output means responsive to said output whereby collection efficiency of IR radiation is improved.

9. The IR detector antenna unit of claim 8, wherein the array includes pixel dimensions of approximately 10 micrometers to approximately 10 micrometers on each side.

10. The IR detector antenna unit of claim 8, wherein each of said two parallel arms are separated by approximately three micrometers.

11. The IR detector antenna unit of claim 8, wherein each of said parallel arms extend directly outwardly from said sensor in an opposed direction.

12. The IR detector antenna unit of claim 8, wherein the focal plane array has dimensions of approximately 12 millimeters to approximately 50 millimeters on a side.

13. The IR detector antenna unit of claim 8, wherein the metal antenna arms are formed from at least one of: nickel, aluminum, and gold.

14. The IR detector antenna unit of claim 8, wherein the infrared (IR) bolometer sensor is vanadium oxide.

* * * * *

UNITED STATES PATENT AND TRADEMARK OFFICE
CERTIFICATE OF CORRECTION

PATENT NO. : 6,459,084 B1 Page 1 of 1
DATED : October 1, 2002
INVENTOR(S) : Boreman et al.

It is certified that error appears in the above-identified patent and that said Letters Patent is hereby corrected as shown below:

Column 1,
Lines 4-7, should be changed to read:

-- This application is a Continuation-In-Part of U.S. Application Ser. No.09/004,132, filed on Jan. 7. 1998, which claims priority of Provisional Application No. 60/048,334 filed May 30, 1997, now U.S. Pat. No. 6,037,590, and this invention was made with Government support under N66001-98-D-6003 awarded by Space and Naval Warfare Systems Center, San Diego. The Government has certain rights in this invention. --

Signed and Sealed this

Fifth Day of October, 2004

JON W. DUDAS
*Director of the United States Patent and Trademark Office*